(12) United States Patent  (10) Patent No.: US 8,037,788 B2
Proper  (45) Date of Patent: Oct. 18, 2011

(54) TIGHT-SPOT FITTING AND DRIVER, AND METHOD OF USE THEREOF

(75) Inventor: George N. Proper, Milpitas, CA (US)

(73) Assignee: Dionex Corporation, Sunnyvale, CA (US)

( * ) Notice: Subject to any disclaimer, the term of this patent is extended or adjusted under 35 U.S.C. 154(b) by 0 days.

(21) Appl. No.: 12/178,845

(22) Filed: Jul. 24, 2008

(65) Prior Publication Data

US 2010/0018359 A1   Jan. 28, 2010

(51) Int. Cl.
*B25B 13/48* (2006.01)
*B01D 15/08* (2006.01)
*G01N 30/02* (2006.01)

(52) U.S. Cl. ...... 81/436; 210/198.2; 73/61.52; 73/61.53

(58) Field of Classification Search ............... 81/124.2, 81/436, 452, 460, 461; 210/198.2; 285/384, 285/393; 606/104, 304; 73/61.52, 61.53
See application file for complete search history.

(56) References Cited

U.S. PATENT DOCUMENTS

| | | | | |
|---|---|---|---|---|
| 3,584,667 A * | 6/1971 | Reiland | ............. | 81/460 |
| D264,300 S * | 5/1982 | Imm | ............. | D8/28 |
| 4,757,729 A | 7/1988 | Martinmaas | | |
| 5,862,725 A * | 1/1999 | Negus | ............. | 81/461 |
| 5,873,290 A * | 2/1999 | Chaconas | ............. | 81/436 |
| 6,099,311 A * | 8/2000 | Wagner et al. | ............. | 433/163 |
| 6,122,997 A | 9/2000 | Altura | | |
| 6,382,057 B1* | 5/2002 | Kienholz | ............. | 81/177.2 |
| 7,044,034 B2* | 5/2006 | Hsien | ............. | 81/452 |
| 7,066,062 B2* | 6/2006 | Flesher | ............. | 81/442 |
| 7,181,999 B1* | 2/2007 | Skeels et al. | ............. | 81/124.2 |
| 2005/0120838 A1* | 6/2005 | Gottlieb et al. | ............. | 81/452 |
| 2005/0199540 A1* | 9/2005 | Zelechonok et al. | ...... | 210/198.2 |
| 2005/0204875 A1* | 9/2005 | Schluter | ............. | 81/436 |
| 2006/0038402 A1* | 2/2006 | Norman et al. | ............. | 285/384 |
| 2006/0219617 A1* | 10/2006 | Schaefer | ............. | 210/198.2 |
| 2008/0071282 A1* | 3/2008 | Assell et al. | ............. | 606/92 |
| 2009/0146380 A1* | 6/2009 | Votaw et al. | ............. | 277/314 |

FOREIGN PATENT DOCUMENTS

| | | | | |
|---|---|---|---|---|
| EP | 58219 A1 | * | 8/1982 | |
| GB | 2050899 A | * | 1/1981 | |
| JP | 08243941 A | * | 9/1996 | |

* cited by examiner

*Primary Examiner* — David B Thomas
(74) *Attorney, Agent, or Firm* — Morgan, Lewis & Bockius, LLP; Victor E. Johnson

(57) ABSTRACT

A tight-spot fitting includes an elongated body configured to be inserted into and extracted from an aperture of a device, a user-operable head configured to be manipulated by a user to rotate the elongated body with respect to the aperture of the device, a depression in the user-operable head dimensioned and configured to receive a corresponding driver, and a through-bore extending through the elongated body and the user-operable head into the depression. The through-bore is configured and dimensioned to receive a line therethrough such that when the elongated body portion is inserted into the aperture, the line spans the aperture and through-bore, and extends through the depression.

A tight-spot driver includes an elongated body, an operational end at a first end of the body, configured and dimensioned for insertion into a depression of a fitting, a user-operable head at a second end of the body, configured to allow a user to rotate the body in order to rotate the fitting when the operational end may be inserted in the depression of the fitting, and a slot extending from the operational end along at least a portion of the body. The slot is dimensioned and configured to accommodate a tubing the fitting extending the depression of the fitting A method of using the tight-spot fitting and driver is also disclosed.

16 Claims, 5 Drawing Sheets

TIGHT-SPOT FITTING AND DRIVER, AND METHOD OF USE THEREOF

BACKGROUND OF THE INVENTION

1. Field of the Invention

The present invention relates to a pass-through fitting and corresponding driver, particularly suited for use in preparative or analytical instrumentation and other applications, and methods for their use.

2. Description of Related Art

Fittings through which fluid tubing and other lines pass are well known. For example, U.S. Pat. No. 6,122,997 to Altura discloses a fluid tube fitting and an adapter to tighten the fitting.

Similar fittings are often utilized in various preparative or analytical instrumentation, such as some types of chromatography, mass spectrometry instrumentation. Tubing is generally provided to fluidly interconnect various subassemblies that may be remote from one another and/or located in isolated environments. How and where to position and secure the tubing while maintaining the integrity of the fluid isolation may be a particular challenge.

The subassemblies often include fluid containers, valves, and other components having ports and other means through which the tubing runs. However, preparative or analytical instrumentation is often housed in such close quarters that the size and geometry of the fittings is a major design concern, and obtaining access to threaded fittings with a wrench even more so. In light of the foregoing, it would be beneficial to have methods and apparatus which overcome the above and other disadvantages of known fittings.

BRIEF SUMMARY OF THE INVENTION

One aspect of the present invention is directed to a fitting including an elongated body configured to be inserted into and extracted from an aperture of a device, a user-operable head configured to be manipulated by a user to rotate the elongated body with respect to the aperture of the device, a depression in the user-operable head dimensioned and configured to receive a corresponding driver, and a through-bore extending through the elongated body and the user-operable head into the depression. The through-bore is configured and dimensioned to receive a line therethrough such that when the elongated body portion is inserted into the aperture, the line spans the aperture and through-bore, and extends through the depression.

The elongated body may include threads. The depression may be dimensioned and configured to receive an internal driver. The depression may be dimensioned and configured to receive a driver selected from the group consisting of POZIDRIV®, TORX®, hex (also called "ALLEN®"), ROBERTSON®, and triple square drivers.

Another aspect of the present invention is directed to a driver including an elongated body, an operational end at a first end of the body, configured and dimensioned for insertion into a depression of a fitting, a user-operable head at a second end of the body, configured to allow a user to rotate the body in order to rotate the fitting when the operational end may be inserted in the depression of the fitting, and a slot extending from the operational end along at least a portion of the body. The slot is dimensioned and configured to accommodate a tubing extending through the depression of the fitting.

The operational end may include a engaging member selected from the group consisting of consisting of POZIDRIV®, TORX®, hex (also called "ALLEN®"), ROBERTSON®, and triple square drivers. The user-operable head may be configured to be manipulated directly by a user. The user-operable head may be configured to be manipulated by a torque wrench or an open-ended wrench. The slot may be disposed along a surface edge of the elongated body. The slot may include a cross-section that may be substantially rectangular.

Another aspect of the present invention is directed to a method of rotating a fitting. The fitting may include an elongated body with a user-operable head having a driver depression, and the fitting may further include a through-bore extending through a portion of the user-operable head and through a portion of the elongated body, wherein a line may be disposed and extends through the through-bore and through the driver depression. The method includes inserting a driver into the driver depression of the user-operable head of the fitting, such that the line extends through a slot provided in the driver, and turning the driver to rotate the fitting.

The line may be a fluid tubing extending through the fitting. The method may further include the steps: removing the driver from the driver depression of the fitting; re-positioning the wrench; re-inserting the driver into the driver depression of the fitting bolt, such that the line extends within the slot; and/or turning the driver again to further tighten or loosen the fitting. The method may further include repeating the removing, re-positioning, re-inserting and turning steps until the fitting may be deemed sufficiently tightened or loosened. The turning may be accomplished manually. The turning may include turning with a torque wrench or open-ended wrench.

The methods and apparatus of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As described above, preparative or analytical instrumentation often requires fluid tubing to fluidly interconnect various subassemblies that may be remote from one another and/or located in isolated environments. Fluid containers, reservoirs, and other sources may be sealed with various valve configuration. Also, multi-port valves may be utilized to provide means for directing and managing fluid flow, and various other subassemblies may be provided for fluid control and management which utilize various fittings through which fluid tubing extends. For example, some chromatography instrumentation may utilize 10-port valves which include fittings in close proximity to one another (as will be discussed below with reference to FIG. 4). It is advantageous to provide as a high-density of fittings in close proximity (e.g., in a "tight-spot") in order to maximize the number of ports on a valve or other component. However, if the footprint and/or overall dimensions of the valve or other component is limited, the size and geometry of the fittings, as well access to the fittings for assembly, removal and maintenance becomes particular concern as it is generally necessary access the fittings with wrenches in order to tighten and loosen the fittings.

Figure 1A:
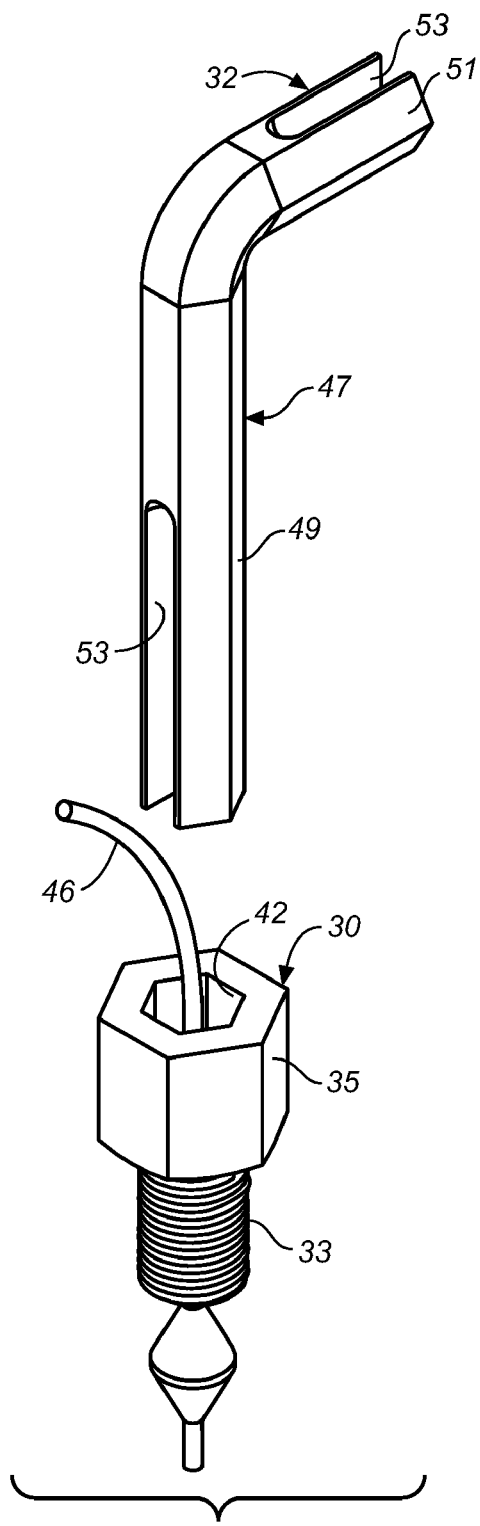
FIG. 1A and FIG. 1B are perspective views of an exemplary tight-spot fitting and driver in accordance with various aspects the present invention.
Figure 1B:
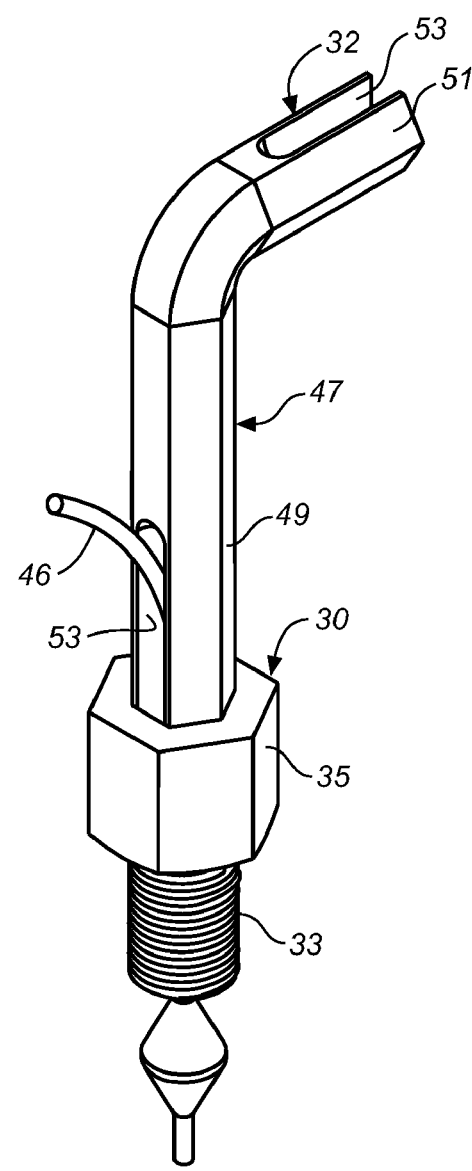

Turning now to the drawings, wherein like components are designated by like reference numerals throughout the various figures, attention is directed to FIGS. 1A and 1B which show an exemplary fitting, generally designated 30, and corresponding driver, generally designated 32, in accordance with various aspects of the present invention that provides a fitting of a relatively small size, that is easily accessible by the driver, regardless of the proximity of other threaded fittings and/or obstacles.

Referring to FIGS. 1A and 1B, fitting 30 generally includes an elongated body 33 and a user-operable head 35. In more detail, an exemplary fitting 30 generally includes of an elongated body 14 and a user-operable head 35. The elongated body can be engagingly inserted into and extracted into an aperture or port 37, such as a port of a valve body 39 (see, e.g., FIG. 4), chromatography column 40 (see, e.g., FIG. 5), or other device. One will appreciate that the fitting of the present invention may be utilized as a port in a wide variety types preparative or analytical equipment, fluid handling equipment and other devices. For example, the fitting of the present invention may also be utilized to provide connectors and/or passageways for electric wires, fiber optic cables, and/or other lines.

The fitting may be formed of a variety of materials such as plastic, metal, and/or other materials. Exemplary materials include steel, stainless steel, titanium, hardened anti-magnetic brass, bronze, beryllium, thermo-plastic injection molded materials including both fiber-reinforced and non-fiber-reinforced materials, polyetheretherketone ("PEEK") including carbon-fiber reinforced PEEK, and glass-filled nylon.

In some embodiments, the elongated body 33 is threaded, and is thus tightened into and loosened from port 37 by clockwise and counterclockwise rotation. The user-operable head 35 is configured to be manipulated by a user to tighten and loosen the elongated body into and out of the port, either manually or with a tool. For example, depression 42 may configured to receive an internal driver, such as a hex key. In the illustrated exemplary embodiments, the user-operable head includes a depression 42 for "internally" receiving driver 32. For example, the driver may be in the form of a hex key or ALLEN® wrench dimensioned to be inserted into the depression for tightening and loosening the fitting in an otherwise conventional manner. The depressions may be configured to receive a variety of drivers including, but not limited to POZIDRIV®, TORX®, hex (also called "ALLEN®"), double hex, ROBERTSON®, triple square or XZN. One will appreciate that the depressions may be configured to internally receive a number of other drivers including, but not limited to slotted, PHILLIPS®, TRY-WING®, TORQ-SET®, spanner head, polydrive, or spline drive.

Fitting 30 also has an axial through-bore 44 such that tubing 46 can be pass through the fitting. The through-bore extends through both the body and the user-operable head such that the through-bore extends into depression 42 of the user-operable head 35. Through-bore 44 is configured to allow tubing 46 extend through the fitting such that it spans the hole 42 and protrudes from the user-operable head 35. One will appreciate that other examples of the through-bores are within the scope of the invention. For example, the through-bore may offset from the longitudinal axis of the fitting, may be non-cylindrical, may include a plurality of bores, and/or, may be open to a circumferential surface of the elongated body and/or user-operable head.

An exemplary driver 32 generally includes an elongated body 47 with a long arm 49 and a short arm 51. In the illustrated embodiment, the driver has a substantially uniform hexagonal cross-section such that the ends of both the long and short arms are configured for insertion into and turning of fitting 30. For example, when additional torque is necessary to tighten fitting, a user may insert the end of short arm 51 into depression 42 and grasp long arm 49 to turn the fitting. In instances where access to the fitting is limited, the user may insert the long arm end into the depression, and grasp the short arm to turn the fitting. Also, one will appreciate that a user may rotate the driver either manually or with the aid of an additional tool such as a torque wrench or an open-ended wrench.

The exemplary illustrated driver 32 of FIGS. 1A and 1B is in the form of a hexagonal key, however, one will appreciate that a wide variety of drivers may be utilized including, but not limited to POZIDRIV®, TORX®, hex (also called "ALLEN®"), ROBERTSON®, triple square or XZN. One will appreciate that other drivers may be provided including, but not limited to slotted, PHILLIPS®, TRY-WING®, TORQ-SET®, spanner head, polydrive, or spline drive.

Also, the driver may be generally L-shaped as shown in FIGS. 1A and 1B, however, one will appreciate that the driver may be T-shaped, Y-shaped, X-shaped, or have other configurations.

The driver may be formed of a variety of materials such as plastic, metal, and/or other materials. Exemplary materials include steel, stainless steel, titanium, hardened anti-magnetic brass, bronze, beryllium, thermo-plastic injection molded materials including both fiber-reinforced and non-fiber-reinforced materials, polyetheretherketone ("PEEK") including carbon-fiber reinforced PEEK, and glass-filled nylon.

It is contemplated that a plastic wrench is useful in relatively low to moderate torque applications such as high performance liquid chromatography ("HPLC") and ion chromatography ("IC"), and a metal wrench, in conjunction with a metal fitting 30, is more useful in relatively higher torque applications. The materials listed above are for purposes of example only, and the present invention should not be construed as being limited thereto.

With continued reference to FIGS. 1A and 1B, driver 32 has an axially extending slot 53 that is dimensioned and configured for alignment with through-bore 44 of fitting 30 such that tubing 46 can extend freely through the fitting and the driver when driver 32 is engaged with fitting 30 for tightening and loosening the fitting.

Preferably, slot 53 is disposed along an edge of driver body 47. Such configuration allows driver 32 to be inserted into fitting 30 without obstruction by tubing 46. In particular, such configuration allows an end of the driver to be easily inserted into and removed from depression 42 of the fitting as the tubing freely extends through slot 53. As such, that the fitting can be turned by the driver without removal of the tubing.

Figure 3A:
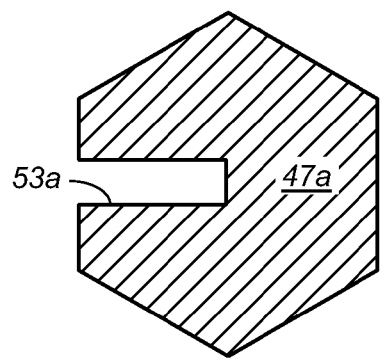
FIGS. 3A-3D are lateral cross-sections of other exemplary drivers similar to that shown in FIG. 1B.
Figure 3B:
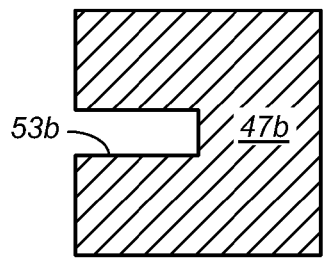
Figure 3C:
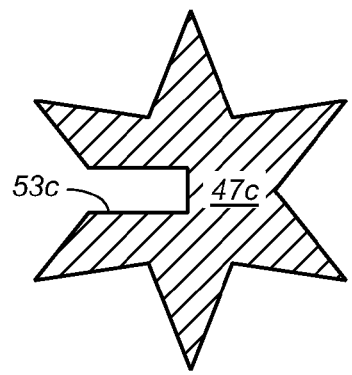
Figure 3D:
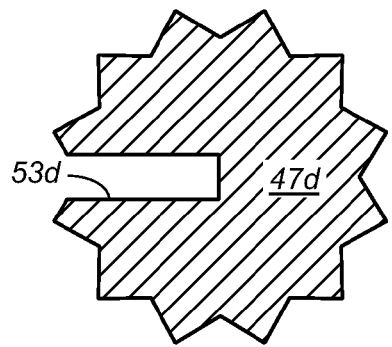

Slot 53 may be generally obround in cross-section, as shown in FIGS. 1A, and 1B, may be generally rectangular in cross-section, as shown in FIG. 3A, or may have a variety of other shapes that is deemed advantageous to accommodate tubing 46.

Figure 2:
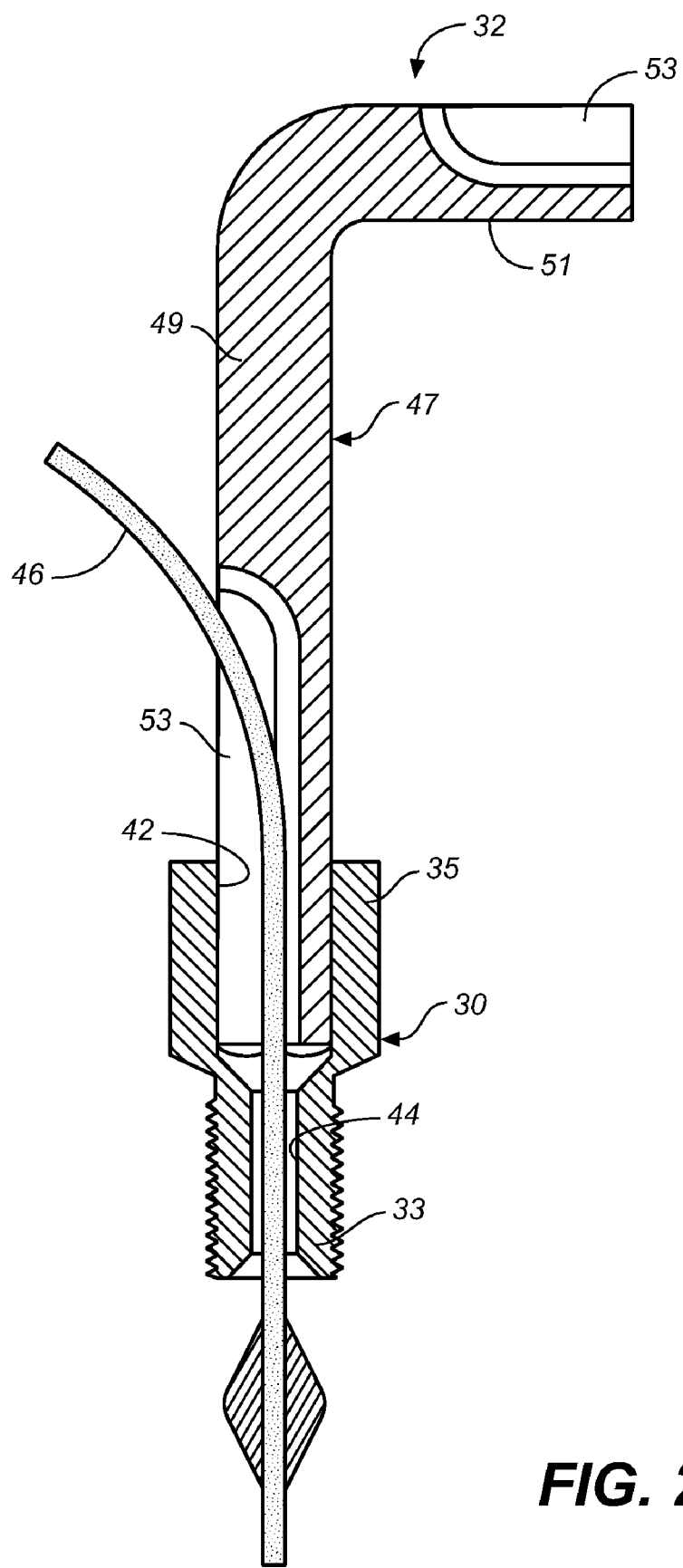
FIG. 2 is a cross-sectional view of the fitting and driver of FIG. 1B, taken along line 2-2 of FIG. 1B.

In the illustrated embodiment, two slots are provided, one on the end of long arm 49, and one on the end of short arm 51, as shown in FIG. 2. One will appreciate that the number of slots will vary depending upon the driver configuration. For example, three slots may be provided if the driver has a T-shaped or Y-shaped configuration, and four slots may be provided if the driver has an X-shaped configuration. One will also appreciate that the slots may be otherwise configured to cooperate with various through-bore configurations of the fitting. For example, the slots may be dimensioned and configured to cooperate with through-bores offset from the longitudinal axis of the fitting, non-cylindrical through-bores, a plurality of through-bores, and/or, open through-bores such as those described above.

An exemplary driver 32 has a $7/32"$ wide cross-section and a $0.070"$ wide slot 53. This size may be useful in applications such as chromatography, but the present invention is not limited to any particular size. Likewise, the slot is illustrated as extending approximately halfway through the width of the driver, but this depth will vary based on the application, the size of the driver, and the type of tubing being used.

In operation, and end of driver 32 is placed in depression 42 such that a portion of the tubing extends out of user-operable head 35 of the fitting and runs through slot 53 of the driver. The driver may then turned to tighten or loosen the fitting.

An exemplary method of tightening or loosening the above-described fitting is as follows. Driver 32 is inserted into the user-operable head 35 of fitting 30, such that tubing 46 extends within slot 53 of the driver. This may be accomplished by manually positioning the tubing in the slot and then moving driver 32 axially into depression 42 of the fitting. Alternatively, the two steps may be performed simultaneously. Driver 32 is then turned to tighten or loosen the fitting 30. If the tubing offers resistance to turning more than certain amount, the driver may be removed from the depression as soon as the resistance is felt, re-positioned, re-inserted into the fitting depression such that the tubing extends within the driver slot and turned again to further tighten or loosen the fitting. The method may be repeated until the fitting is deemed sufficiently tightened or loosened. As noted above, the driver may be turned manually, or with an additional tool such as a torque wrench or open-ended wrench.

Figure 4:
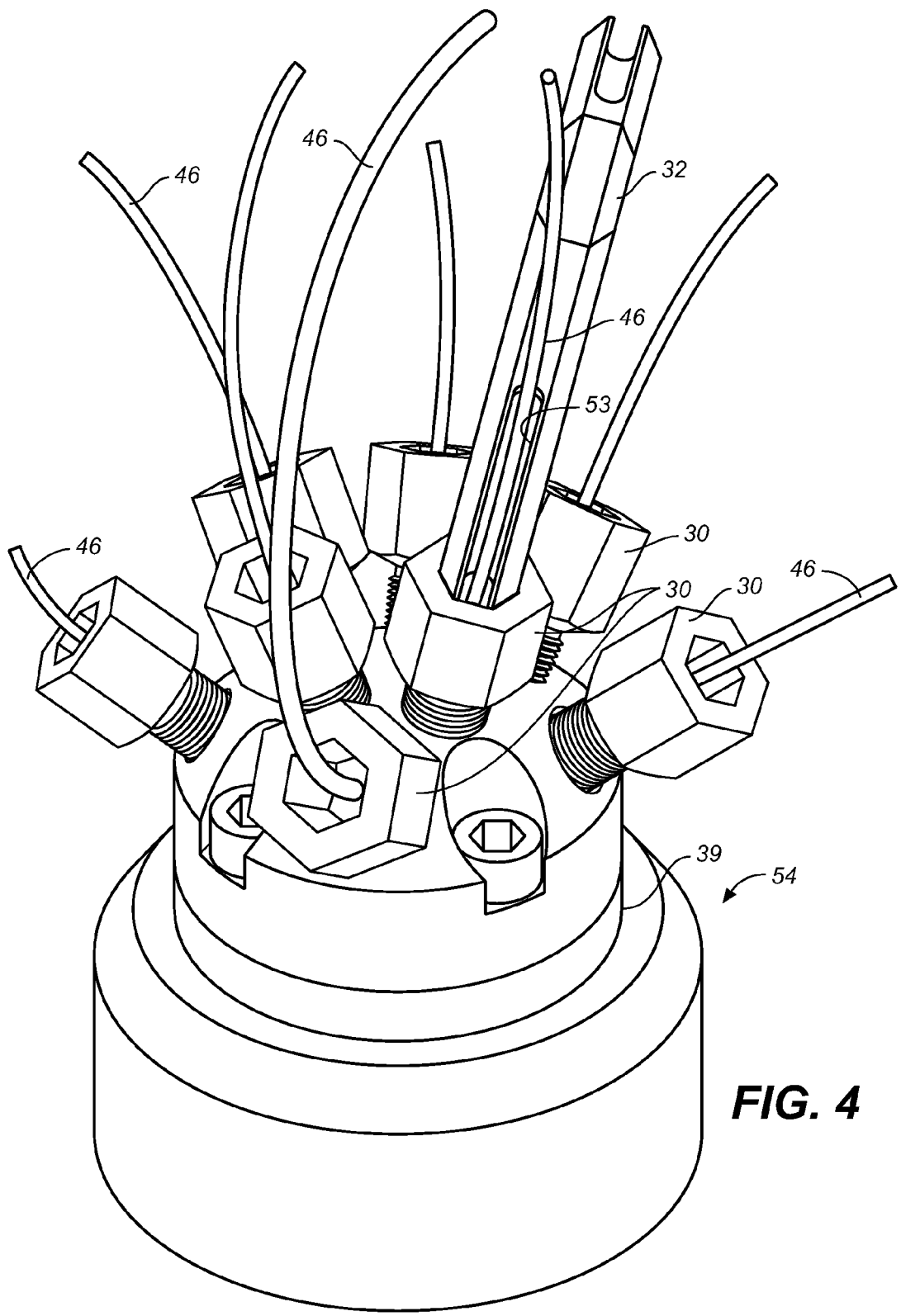
FIG. 4 is a perspective view of an analytical instrumentation valve having a number of fittings similar to that shown in FIG. 1A in close proximity with one another.
Figure 5:
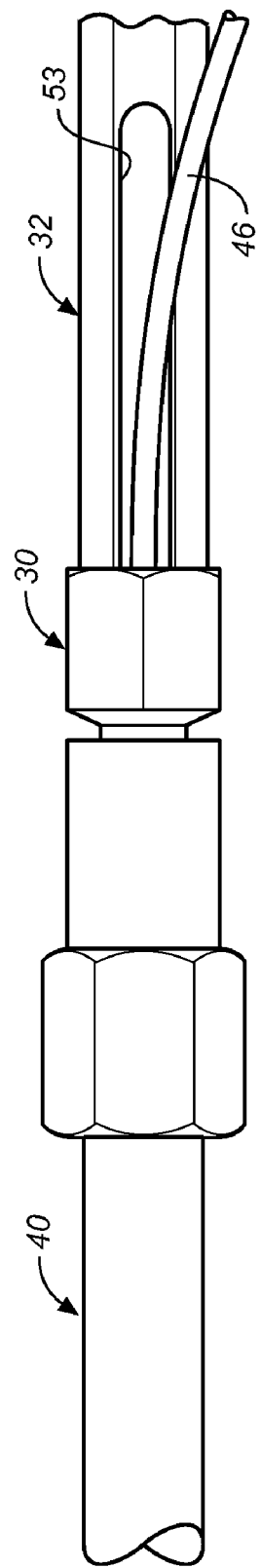
FIG. 5 is a perspective view of an analytical column utilizing a fitting similar to that shown in FIG. 1A.

Turning now to FIG. 4, a number of fittings 30 are installed in a multi-port valve of a chromatography system. In this embodiment, the fittings have a 10-32 threaded configuration and are installed in a ten-port valve 54. A number of fittings 30 can be seen with tubing 46 extending out therefrom, with one fitting in the process of being turned by driver 32. With reference to FIG. 5, fitting 30 may also be mounted on the end of a chromatography column.

It should be appreciated that the exemplary driver can be readily used on any of the illustrated fittings, regardless of their location or surroundings, without disturbing the tubing, surrounding tubing, and/or surrounding fittings. While this illustration is of a multiport valve particularly useful in chromatography, it should be appreciated that the fitting and driver of the present invention have numerous applications, and may be useful any time fittings having pass-through tubing, wire, or other lines are used in close quarters.

Advantageously, the configuration of fitting 30 and driver 32 of the present invention obviates the need to remove tubing 46 for manipulation of fitting 30, and allows and thus solves the problem of adjacent threaded fittings or other obstacles impeding the manipulation of the fitting 10.

Also, the configuration of fitting 30 and driver 32 of the present invention allows for good connections and allows one to push tubing 46 such that it extends to the bottom of its respective container and/or seats properly within its fluid passageway. Thus, the fitting or the present invention allows one to minimize dead volumes and unswept spaces. By minimizing dead volumes and unswept spaces, the fitting of the present invention may thus enhance chromatography performance and/or overall analytic performance.

In many respects various modified features of the various figures resemble those of preceding features and the same reference numerals followed by subscripts "a", "b", "c", and "d" designate corresponding parts.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fitting, comprising:
    an elongated body configured to be inserted into and extracted from an aperture of a device;
    a user-operable head configured to be manipulated by a user to rotate the elongated body with respect to the aperture of the device;
    a depression in the user-operable head dimensioned and configured to receive an internal driver;
    a through-bore extending through the elongated body and the user-operable head into the depression; and
    a tubing extending through the through-bore such that when the elongated body portion is inserted into the aperture, the line spans the aperture and through-bore, and extends through the depression,
    wherein the depression is dimensioned and configured to receive the internal driver.

2. The fitting of claim 1, wherein the elongated body comprises threads.

3. The fitting of claim 1, wherein the depression is dimensioned and configured to receive an internal driver selected from the group consisting of square, hex, slot, cruciform, and triple square drivers.

4. The fitting of claim 1, wherein the tubing is a tubing of a chromatography system.

5. A driver, comprising:
    an elongated body;
    an operational end at a first end of the body, configured and dimensioned for insertion into a depression of a fitting;
    a user-operable head at a second end of the body, configured to allow a user to rotate the body in order to rotate the fitting when the operational end is inserted in the depression of the fitting; and a slot extending away from the operational end along at least a portion of the body and at least halfway through a width of the body, said slot dimensioned and configured to accommodate a tubing extending through the depression of the fitting.

6. The driver of claim 5, wherein the operational end comprises an engaging member selected from the group consisting of square, hex, slot, cruciform, and triple square drivers.

7. The driver of claim 5, wherein the user-operable head is configured to be manipulated directly by a user.

8. The driver of claim 5, wherein the user-operable head is configured to be manipulated by a torque wrench or an open-ended wrench.

9. The apparatus of claim 5, wherein the slot is disposed along a surface edge of the elongated body.

10. The apparatus of claim 5, wherein the slot comprises a cross-section that is substantially rectangular.

11. A method of rotating a fitting, wherein the fitting comprises an elongated body with a user-operable head having a driver depression, wherein the fitting further includes a through-bore extending through a portion of the user-operable head and through a portion of the elongated body, wherein a line is disposed and extends through the through-bore and through the driver depression, the method comprising:

inserting a driver into the driver depression of the user-operable head of the fitting, such that the line extends through a slot provided in the driver; and turning the driver to rotate the fitting.

12. The method of claim 11, wherein the line is a fluid tubing extending through the fitting.

13. The method of claim 11, further comprising the steps:

removing the driver from the driver depression of the fitting;

re-positioning the wrench;

re-inserting the driver into the driver depression of the fitting, such that the line extends within the slot; and turning the driver again to further tighten or loosen the fitting.

14. The method of claim 13, further comprising repeating the removing, re-positioning, re-inserting and turning steps until the fitting is deemed sufficiently tightened or loosened.

15. The method of claim 13, wherein the turning is accomplished by manual turning.

16. The method of claim 13, wherein the turning comprises turning with a torque wrench or open-ended wrench.

* * * * *